US011474579B2

(12) United States Patent
Regupathy et al.

(10) Patent No.: US 11,474,579 B2
(45) Date of Patent: Oct. 18, 2022

(54) VERIFIED HIGH-POWER TRANSITION AND FAST CHARGING WITH PRE-BOOT SCALING

(71) Applicant: Intel Corporation, Santa Clara, CA (US)

(72) Inventors: Rajaram Regupathy, Bangalore (IN); Peter Ewert, Hillsboro, OR (US); Subrata Banik, Bangalore (IN); Vagdevi P, Bangalore (IN); V Sowmya, Davangere (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/899,077

(22) Filed: Jun. 11, 2020

(65) Prior Publication Data

US 2020/0301492 A1 Sep. 24, 2020

(51) Int. Cl.

| G06F 1/26 | (2006.01) |
|---|---|
| G06F 9/4401 | (2018.01) |
| G06F 21/57 | (2013.01) |
| G06F 21/44 | (2013.01) |
| H02J 7/00 | (2006.01) |
| G06F 1/3212 | (2019.01) |

(52) U.S. Cl.
CPC ............ *G06F 1/263* (2013.01); *G06F 1/3212* (2013.01); *G06F 9/4401* (2013.01); *G06F 21/44* (2013.01); *G06F 21/572* (2013.01); *H02J 7/00045* (2020.01); *H02J 7/0048* (2020.01); *G06F 2221/033* (2013.01)

(58) Field of Classification Search
CPC ...... G06F 1/263; G06F 1/3212; G06F 9/4401; G06F 21/44; G06F 21/572; G06F 2221/033; H02J 7/00045; H02J 7/0048
See application file for complete search history.

(56) References Cited

U.S. PATENT DOCUMENTS

| 8,006,125 | B1 | 8/2011 | Meng et al. |
| 8,762,746 | B1* | 6/2014 | Lachwani ............... G06F 1/263 713/300 |
| 8,797,171 | B2* | 8/2014 | Yasuda ............. H02J 7/007182 340/636.1 |
| 10,283,975 | B1* | 5/2019 | Venkatasamy ........ H02J 7/0048 |
| 10,599,199 | B1* | 3/2020 | De La Cropte De Chanterac ...... G06F 1/28 |
| 11,100,255 | B1* | 8/2021 | Eftimie ................... G06F 21/44 |
| 2010/0024029 | A1 | 1/2010 | Sasaki et al. |

(Continued)

FOREIGN PATENT DOCUMENTS

CN 102883058 A 1/2013

OTHER PUBLICATIONS

Apple Inc., et al, Universal Serial Bus Type-C Port Controller Interface Specification, Version 1.1, Mar. 2020, 110 pages.

(Continued)

*Primary Examiner* — Aurel Prifti
(74) *Attorney, Agent, or Firm* — Jordan IP Law, LLC (57) ABSTRACT

Systems, apparatuses and methods may provide for technology that initiates a boot of a computing system containing an embedded controller while the computing system is in a low power mode, conducts a verification that code to perform the boot is uncorrupted, and negotiates an increased power delivery with a source device connected to the computing system if the verification is successful.

21 Claims, 9 Drawing Sheets

(56) References Cited

U.S. PATENT DOCUMENTS

| | | | | |
|---|---|---|---|---|
| 2013/0232349 | A1* | 9/2013 | Oler | G06F 1/263 713/300 |
| 2013/0232571 | A1* | 9/2013 | Belesiu | G06F 1/263 726/21 |
| 2013/0283028 | A1* | 10/2013 | Zou | G06F 9/441 713/2 |
| 2013/0339757 | A1* | 12/2013 | Reddy | G06F 1/3212 713/300 |
| 2014/0068310 | A1* | 3/2014 | Sultenfuss | G06F 1/30 713/340 |
| 2014/0070774 | A1* | 3/2014 | Terlizzi | H02J 7/0047 320/137 |
| 2014/0375273 | A1* | 12/2014 | Harada | G06F 1/263 320/136 |
| 2015/0089210 | A1 | 3/2015 | Lai et al. | |
| 2015/0172054 | A1* | 6/2015 | Prakash | H04L 9/3263 713/189 |
| 2016/0043586 | A1 | 2/2016 | Wang et al. | |
| 2016/0163802 | A1* | 6/2016 | Glass | H01L 21/7605 257/76 |
| 2016/0294197 | A1* | 10/2016 | Thompson | G06F 1/263 |
| 2017/0093158 | A1* | 3/2017 | Perper | H02J 3/00 |
| 2017/0140887 | A1 | 5/2017 | Waters | |
| 2018/0267598 | A1* | 9/2018 | Pulivendula | G06F 9/4406 |
| 2019/0036365 | A1* | 1/2019 | Regupathy | H02J 7/342 |
| 2019/0087295 | A1* | 3/2019 | Sultenfuss | G06F 13/4081 |
| 2019/0294228 | A1* | 9/2019 | Tamura | G06F 1/26 |
| 2019/0369711 | A1* | 12/2019 | Wang | H04W 24/08 |
| 2020/0089507 | A1* | 3/2020 | Froehlich | G06F 21/575 |
| 2020/0250348 | A1* | 8/2020 | Hamlin | G06F 1/3215 |
| 2020/0410104 | A1* | 12/2020 | Zimmermann | G06F 21/31 |
| 2021/0232196 | A1* | 7/2021 | Sultenfuss | G06F 1/28 |
| 2022/0037905 | A1* | 2/2022 | Kitanosako | G06F 1/266 |

OTHER PUBLICATIONS

Apple Inc., et al, Universal Serial Bus Power Delivery Specification, Version 1.3, Jan. 12, 2017, 547 pages.

The Chromium Projects, "Verified Boot," <chromium.org/chromium-os/chromiumos-design-docs/verified-boot>, retrieved Apr. 9, 2020, 6 pages.

European Search Report for EPO Patent Application No. 20211534.1, dated Jun. 9, 2021, 11 Pages.

Anonymous IOS 9 How-To: Put your iPhone in Low Power Mode & extend your battery life, Nov. 21, 2015, 20 Pages, retrieved from <9tomac.com/2015/11/21/how-to-use-low-power-extend-battery/>.

* cited by examiner

VERIFIED HIGH-POWER TRANSITION AND FAST CHARGING WITH PRE-BOOT SCALING

CROSS-REFERENCED TO RELATED APPLICATIONS

The present application claims the benefit of priority to Indian Provisional Patent Application No. 202041018424 filed Apr. 29, 2020.

TECHNICAL FIELD

Embodiments generally relate to the charging of battery-powered devices. More particularly, embodiments relate to technology that performs verified high-power transitions and fast charging with pre-boot scaling.

BACKGROUND

A battery-powered device (e.g., sink device) may use power received from a source device (e.g., charger) over a USB (Universal Serial Bus, e.g., USB TYPE-C/USB-C Port Controller Interface Specification, Ref. 2.0, Ver. 1.1, March 2020, USB 3.0 Promoter Group) connection to charge an internal battery of the sink device and/or operate the sink device. In some circumstances, the power demands of the sink device may exceed the amount of power initially available from the source device at boot time. Although recent developments in USB technology may permit an embedded controller (EC) of the sink device to negotiate with the source device to obtain a higher level of power from the source device, there remains considerable room for improvement. For example, the high-power negotiation may typically take place only after it has been verified that code to perform the boot is uncorrupted. In such a case, if the internal battery of the source device is either fully depleted or almost fully depleted, there may be insufficient power to verify boot security and the high-power negotiation may never take place. As a result, a negative impact on performance and/or the user experience may be encountered.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
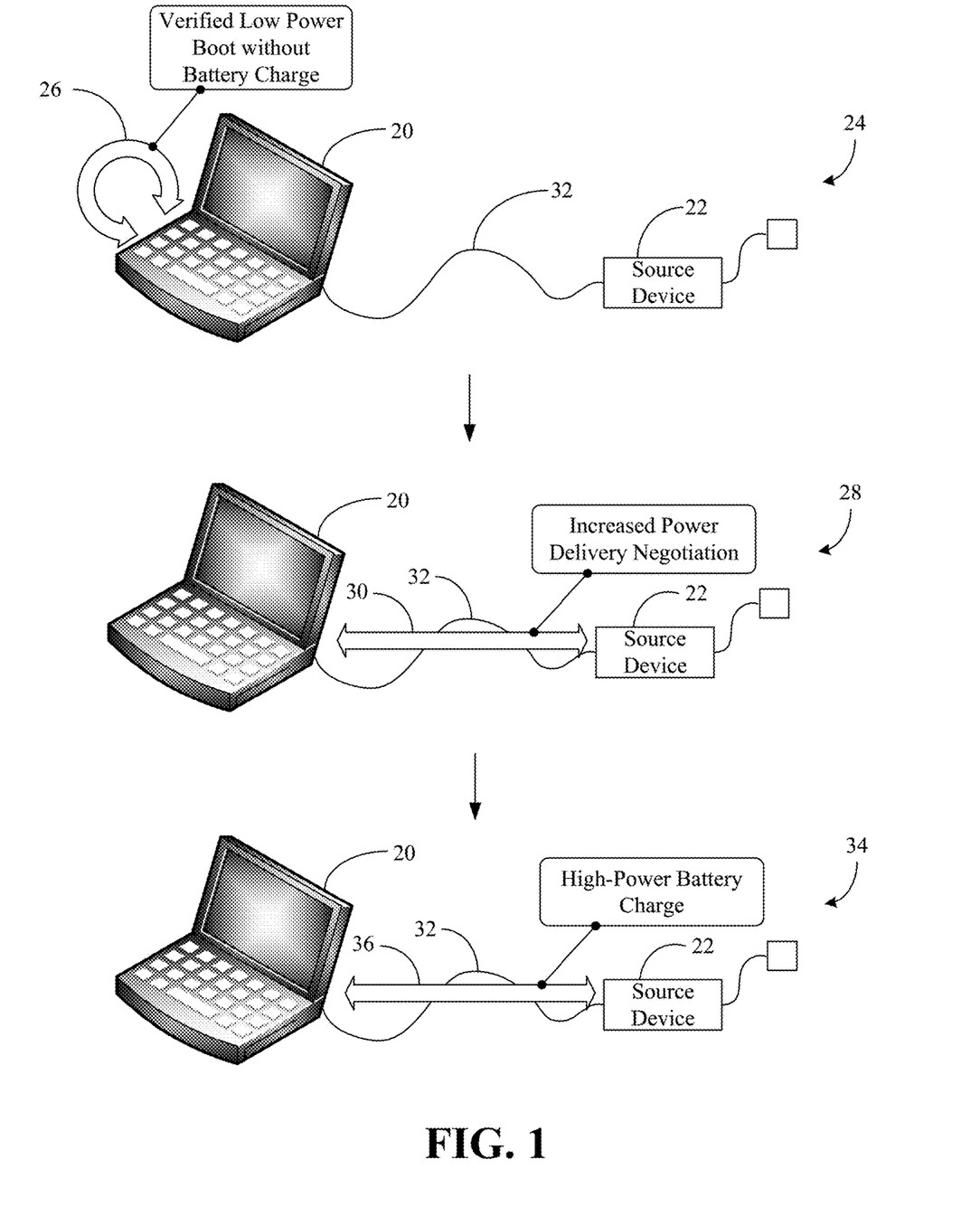
FIG. 1 is an illustration of an example of a verified high-power transition according to an embodiment.

Turning now to FIG. 1, a verified high-power transition is shown for a computing system 20 (e.g., sink device) that is connected to a source device 22 (e.g., charger, host or other device capable of outputting power) via a cable 32 (e.g., USB-C cable). In a first stage 24, the computing system 20 performs a verified low power boot 26 without charging an internal battery of the computing system 20. In an embodiment, the boot 26 is "low power" because the boot 26 occurs while the computing system 20 is in a low power mode (LPM, e.g., components such as graphics controllers, serial busses, radios, sensors, processor cores, memory, displays, etc., are "scaled" to consume less power). Thus, if the initial level of charging power provided by the source device 22 is limited and the internal battery of the computing system 20 is fully depleted (e.g., "dead") or almost fully depleted (e.g., "weak"), the low power mode may enable the computing system 20 to confirm the trustworthiness of the boot 26 without stalling or encountering an error. Additionally, the boot 26 may be considered "verified" because it is confirmed that code to perform the boot 26 is uncorrupted (e.g., by malware) before proceeding to a second stage 28. Indeed, the process of verifying the boot 26 may involve repairing corrupted code.

Upon successful verification of the boot 26 completion, the illustrated computing system 20 conducts a negotiation 30 with the source device 22 for an increased power delivery at the second stage 28. In this regard, the source device 22 may use a configuration channel (CC) signal line in the cable 32 to advertise the initial level of power (e.g., 15 W) that is available to the computing system 20. If the computing system 20 is a device (e.g., CHROMEBOOK) that typically consumes more power (e.g., operating power of ~60 W) than the initial level of power, the negotiation 30 may enable the computing system 20 to obtain sufficient power from the source device 22 to operate and charge the internal battery of the computing system 20 at a relatively high rate (e.g., "fast charge").

Once the negotiation 30 is complete, the illustrated computing system 20 conducts a high-power battery charge 36 at a third stage 34. The illustrated solution therefore enhances stability, security, efficiency and performance by ensuring that stalls and/or errors are not encountered prior to verification of the boot 26. Moreover, charging the internal battery of the computing system 20 at a high rate further enhances performance and improves the user experience.

Figure 2:
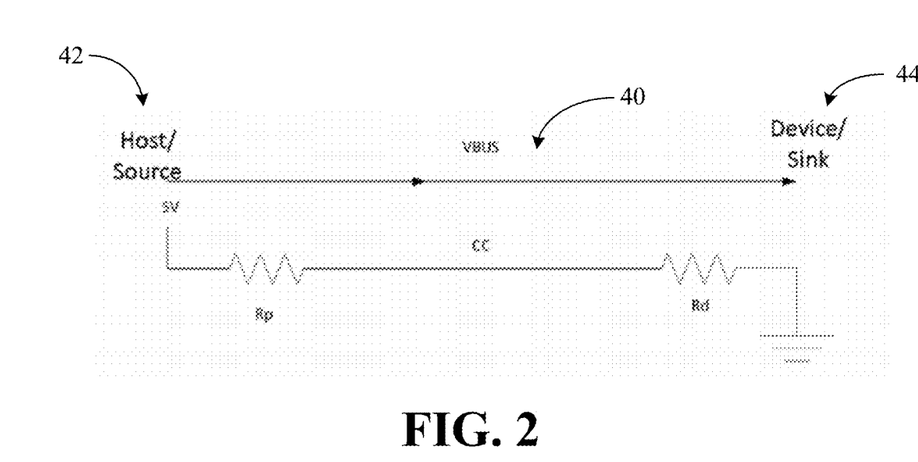
FIG. 2 is a schematic diagram of an example of a source-sink connection according to an embodiment.

FIG. 2 shows a connection 40 between a source device 42 such as, for example, the source device 22 (FIG. 1) and a sink device 44 such as, for example, the computing system 20 (FIG. 1). Thus, the connection 40 may be incorporated into a cable such as, for example, the cable 32 (FIG. 1). In an embodiment, the source device 42 and the sink device 44 are Dual Role Power (DRP) devices that may provide and consume power, and Dual Role Data (DRD) devices that may act as a host and a device. In one example, a configuration process is used to determine 1) connection and orientation detection, and 2) initial power and data role. This configuration process may be carried out over a CC signal line. Attachment or detachment is determined by a specified resistance to ground on the CC line. Over the CC line, the source device 42 presents a pull-up resistance $R_p$ and the sink device 44 presents a programmable pull-down resistance $R_d$ to start the configuration process.

The source device 42 may present three different pull-up resistances on the CC line to advertise the current levels supported. In such a case, the sink device 44 uses the difference on the CC line to determine the current to be drawn from the source device 42 and the sink device 44 remains aware of dynamic changes to the pull-up resistance by the source device 42. In an embodiment, three different current levels supported and the pull-up resistances of the source device 42 are illustrated in Table I below.

TABLE I

| Source Advertisement | Resistor Pull-up to 4.75-5.5 V | Resistor Pull-up 3.3 V +/− 5% |
| --- | --- | --- |
| 900 mA@5 V | 56k ohms | 36k ohms |
| 1.5 A@5 V | 22k ohms | 12k ohms |
| 3 A@5 V | 10k ohms | 4.7k ohms |

To negotiate for higher power of up to, for example, 100 W (20V/5A), a protocol negotiation (e.g., USB Power Delivery/USB-PD Specification, Rev. 2.0, Ver. 1.3, Jan. 12, 2017) may be used. As already noted, the negotiation may be conducted upon verification of a low power boot (e.g., without battery charging).

Figure 3:
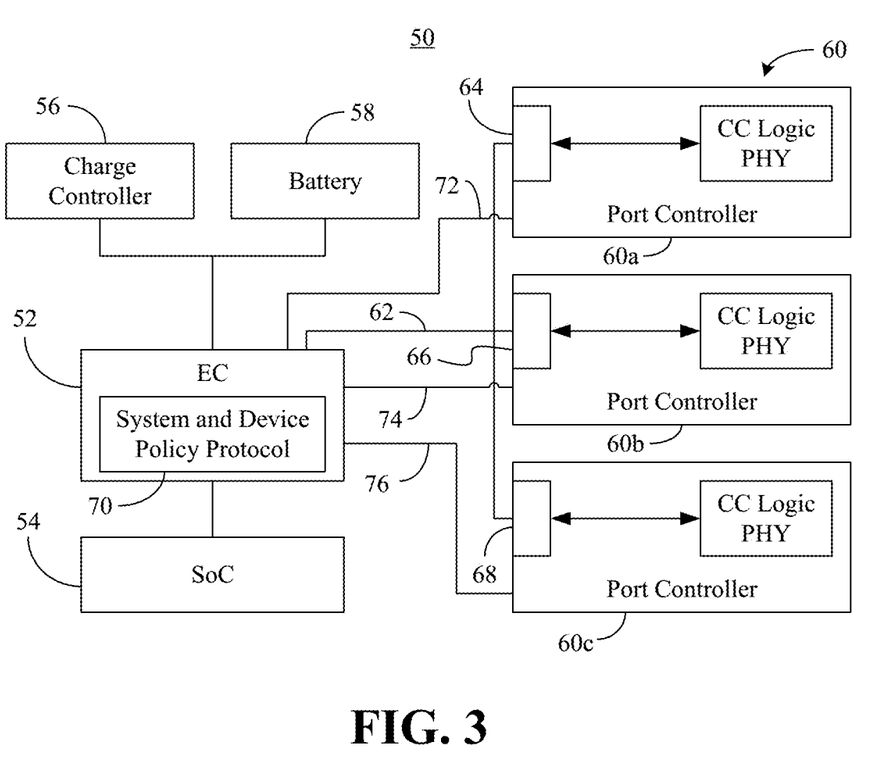
FIG. 3 is a block diagram of an example of a sink device according to an embodiment.

FIG. 3 shows a sink device 50 that may be readily substituted for the computing system 20 (FIG. 1) and/or the sink device 44 (FIG. 2), already discussed. In the illustrated example, an embedded controller 52 (EC) is coupled to an SoC 54 (e.g., including a host processor, graphics processor, input/output module, etc.), a charge controller 56, a battery 58 and a plurality of port controllers 60 (60a-60c). Each port controller 60 may include CC logic PHY (physical layer). In an embodiment, a first port controller 60a includes a first slave interface 64 coupled to a serial bus 62 (e.g., Inter-Integrated Circuit/I²C bus), a second port controller 60b includes second slave interface 66 coupled to the serial bus 62, and a third port controller 60c includes a third slave interface 68 coupled to the serial bus 62. The illustrated EC 52 is also coupled to the serial bus 62 and uses a system and device policy protocol 70 to manage high-power negotiations with a source device (not shown). In an embodiment, the EC 52 uses alert lines 72, 74, 76 to exchange alert messages with the port controllers 60.

Figure 4:
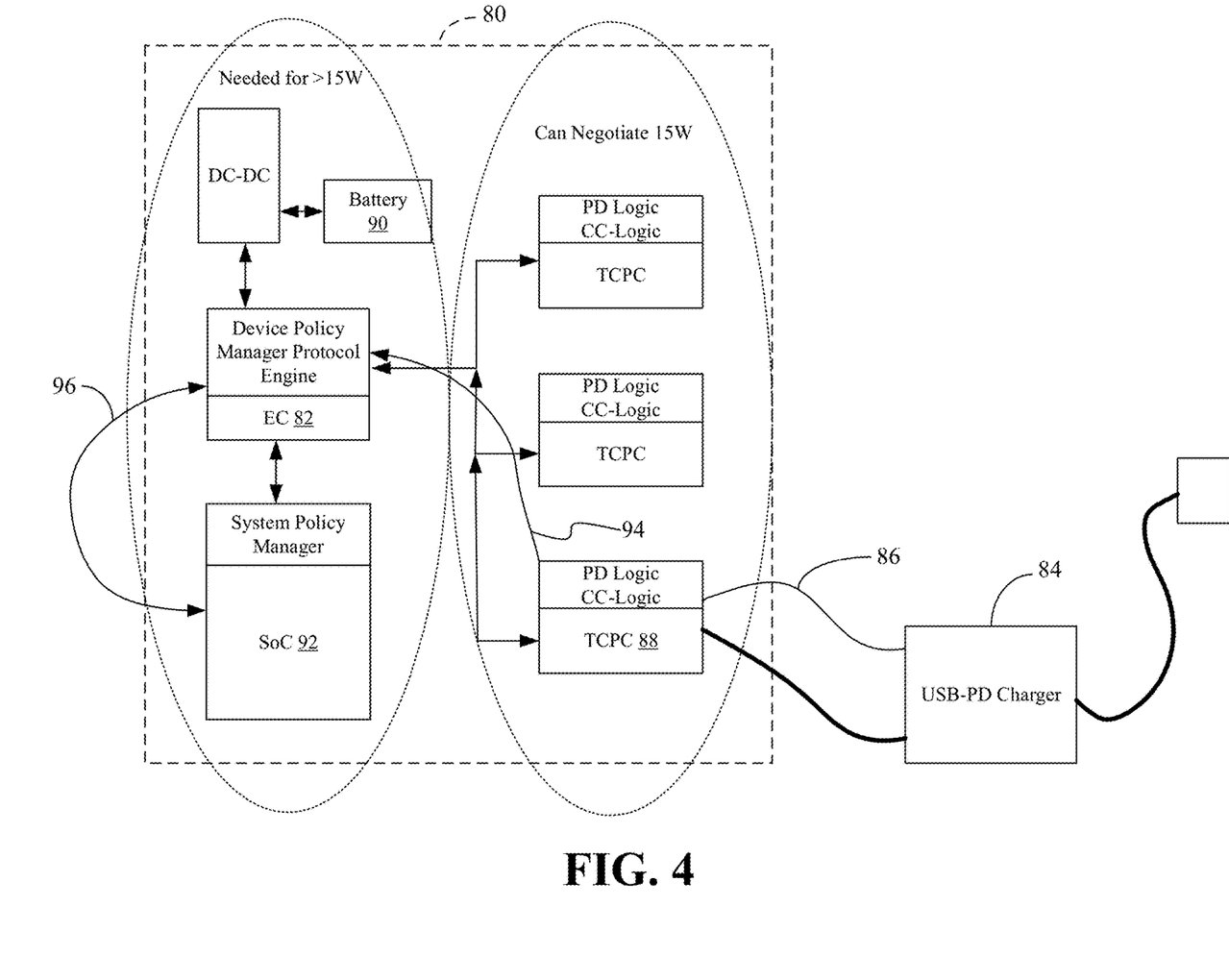
FIG. 4 is a block diagram of an example of a sink device that undergoes a verified high-power transition according to an embodiment.

FIG. 4 shows a sink device 80 that undergoes a verified high-power transition. In general, the sink device 80 performs a secure verification of read/write (RW, e.g., "flashable") firmware in an EC 82 before negotiating for high power. In the illustrated example, when a user plugs in 86 a USB-C charger 84 to the sink device 80, the EC 82 boots up and communicates to the USB-C PHY layer in a Type-C port controller 88 (TCPC) regarding the power advertised. During the process, the EC 82 reads the capacity of an internal battery 90 and determines that the battery level is critical or dead battery. In such a case, the EC 82 may communicate with a power management controller (PMC, not shown) of an SoC 92 and configure/scale the SoC 92 into an optimal low frequency/power mode. In an embodiment, the low frequency/power mode ensures that when the sink device 80 is booted, the peak power requirement of the sink device 80 will not exceed the USB-C power supplied by the charger 84.

The EC 82 may then configure the sink device 80 to power the SoC 92 directly with the USB-C power available, bypassing 94 the battery 90. As the sink device 80 boots, the boot firmware may determine the power available, determine the battery status, and place various domains, blocks and/or components (e.g., all platform relevant "IPs") into low power mode.

The boot firmware may then perform a verification 96 of the RW firmware of the EC 82 to negotiate higher power using USB-PD. After successful negotiation, the boot firmware is in a charging loop with limited functionality due to the low power mode. This limited functionality may enable the sink device 80 to bring the battery 90 to a post critical state. In an embodiment, only user perceivable functionality is brought back in a dead battery 90 situation to provide better user experience and provide maximum power to the battery 90 for faster charging (e.g., enabling a better user experience).

Figure 5:
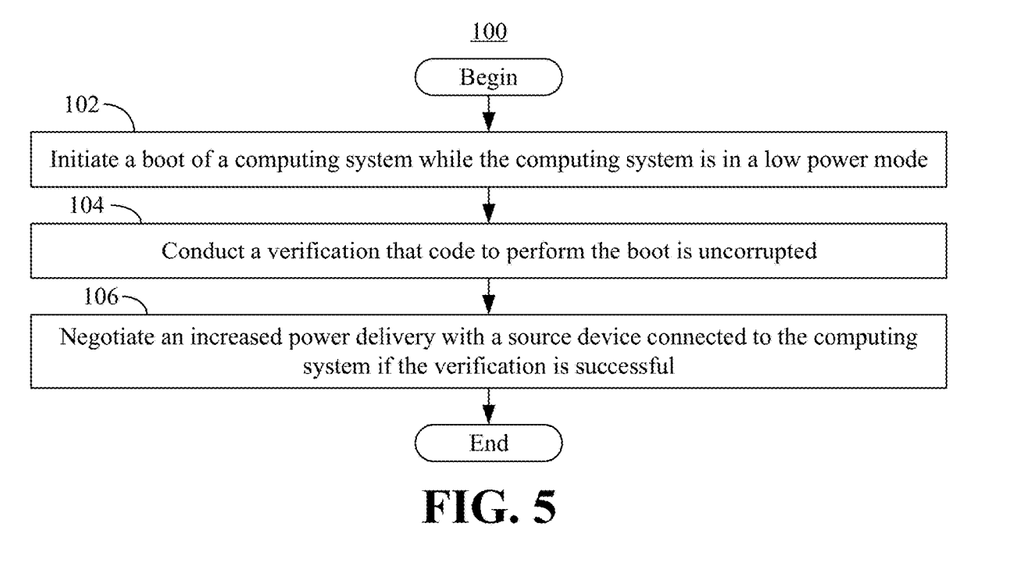
FIG. 5 is a flowchart of an example of a method of operating a performance-enhanced computing system according to an embodiment.

FIG. 5 shows a method 100 of operating a performance-enhanced computing system. The method 100 may generally be implemented in an EC such as, for example, the EC 52 (FIG. 3), already discussed. More particularly, the method 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 100 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 102 provides for initiating a boot of a computing system while the computing system is in a low power mode. As already noted, the low power mode may involve scaling components such as graphics controllers, serial busses, radios, sensors, processor cores, memory, displays, etc., to consume less power. A verification is conducted at block 104 as to whether the boot is complete. In an embodiment, block 104 includes determining the state of flashable code in the EC. Block 106 may negotiate an increased power delivery with a source device connected to the computing system if the verification of block 104 is successful (e.g., the boot code is uncorrupted). The illustrated method 100 therefore enhances stability, security efficiency and performance by ensuring that stalls and/or errors are not encountered prior to verification of the boot. Moreover, charging the internal battery of the computing system at a high rate further enhances performance and improves the user experience.

Figure 6:
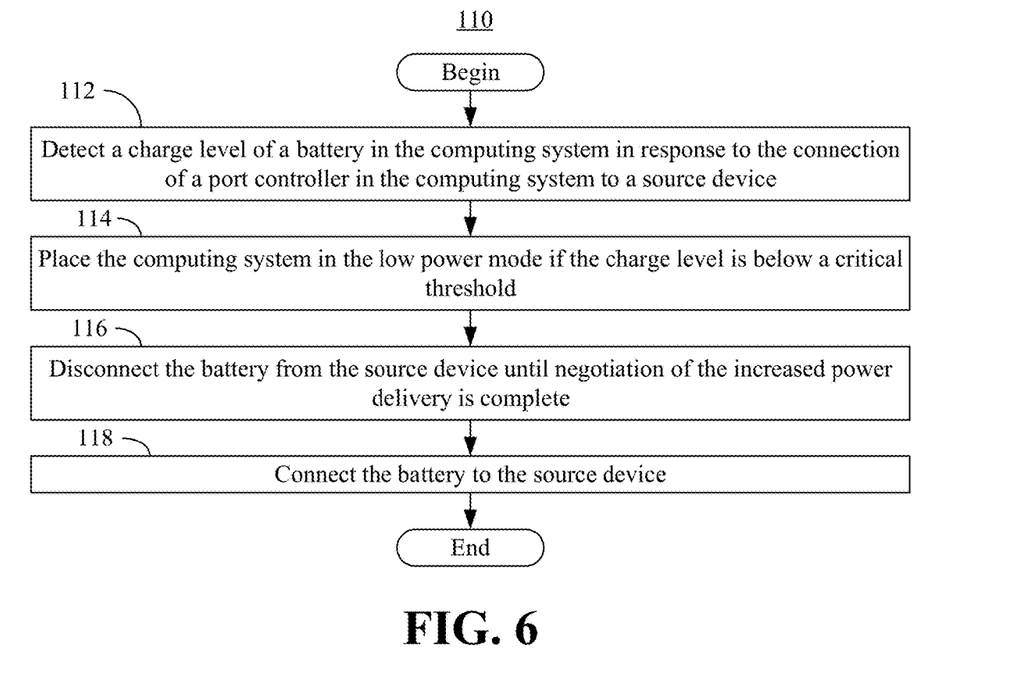
FIG. 6 is a flowchart of an example of a method of charging a battery according to an embodiment.

FIG. 6 shows a method 110 of charging a battery. The method 110 may generally be implemented in an EC such as, for example, the EC 52 (FIG. 3), already discussed. More particularly, the method 110 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 112 detects a charge level of a battery in the computing system in response to the connection of a port controller in the computing system to a source device. The computing system may be placed in the low power mode at block 114 if the charge level is below a critical threshold. In an embodiment, block 116 disconnects the battery from the source device until negotiation of the increased power delivery is complete. Block 118 connects the battery to the source device upon completion of the negotiation. The illustrated method 110 therefore further enhances the user experience by bypassing battery charging until the boot is complete and quickly transitioning to high-power charging afterwards.

Figure 7:
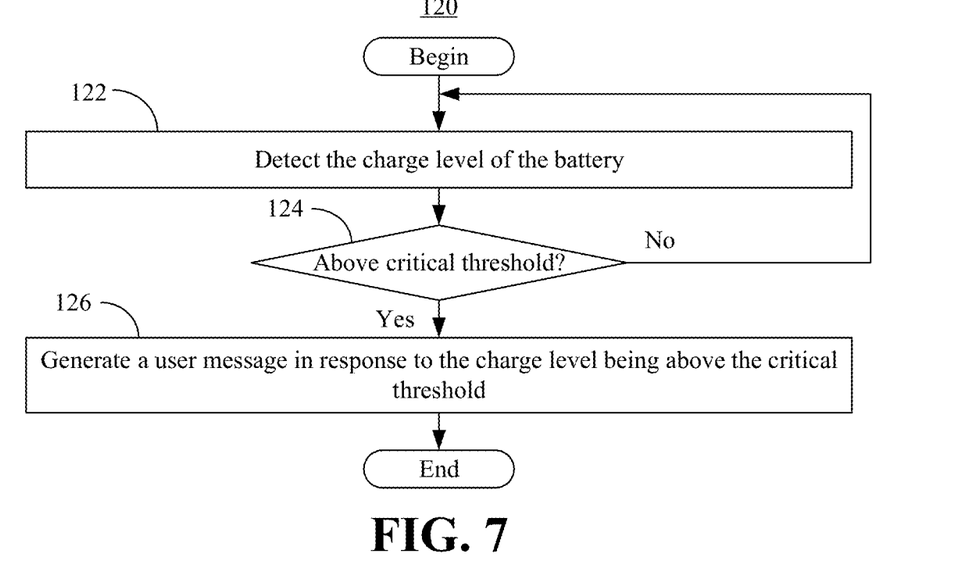
FIG. 7 is a flowchart of an example of a method of generating notifications according to an embodiment.

FIG. 7 shows a method 120 of generating notifications. The method 120 may generally be implemented in an EC such as, for example, the EC 52 (FIG. 3), already discussed. More particularly, the method 120 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 122 detects the charge level of the battery, wherein a determination may be made at block 124 as to whether the charge level is above a critical threshold. If so block 126 generates a user message in response to the charge level being above the critical threshold and the method 120 terminates. In one example, the user message indicates that a dead battery is charging (e.g., informing the user as to why certain functionality of the computing system is not yet available). If it is determined at block 124 that the charge level is not above the critical threshold, the method 120 may repeat block 122. The illustrated method 120 therefore further improves the user experience by keeping the user informed of the state of the system.

Figure 8:
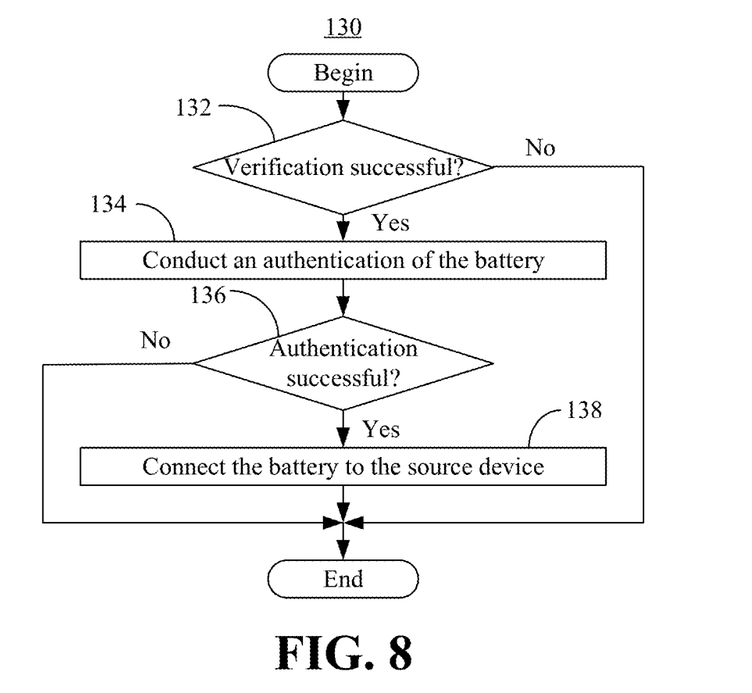
FIG. 8 is a flowchart of an example of a method of authenticating a battery according to an embodiment.

FIG. 8 shows a method 130 of authenticating a battery. The method 130 may generally be implemented in an EC such as, for example, the EC 52 (FIG. 3), already discussed. More particularly, the method 120 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In some cases, an aftermarket battery from an unauthorized manufacturer is installed into a sink device. In those situations, there may be concern over the ability of the battery to support fast charging as described herein. The method 130 generally provides for authentication of the battery to avoid charging failures, system crashes, and so forth. Illustrated processing block 132 determines whether the boot verification has been successful. If so, block 134 conducts an authentication of the battery. Block 134 may include querying and/or reading predetermined information (e.g., authentication keys, serial numbers) from the battery, comparing the predetermined information to secure data and/or settings, and so forth. A determination is made at illustrated block 136 as to whether the authentication was successful (e.g., the battery is from an authorized manufacturer). If so, block 138 may connect the battery to the source device. If it is determined at block 132 that the boot verification was not successful or if it is determined at block 136 that the authentication was not successful, the illustrated method 130 prevents connection of the battery to the source device by bypassing block 138 and terminating. The illustrated method 130 therefore further enhances stability and/or performance by ensuring that compatible batteries are used in the verified high-power transition technology described herein.

Figure 9:
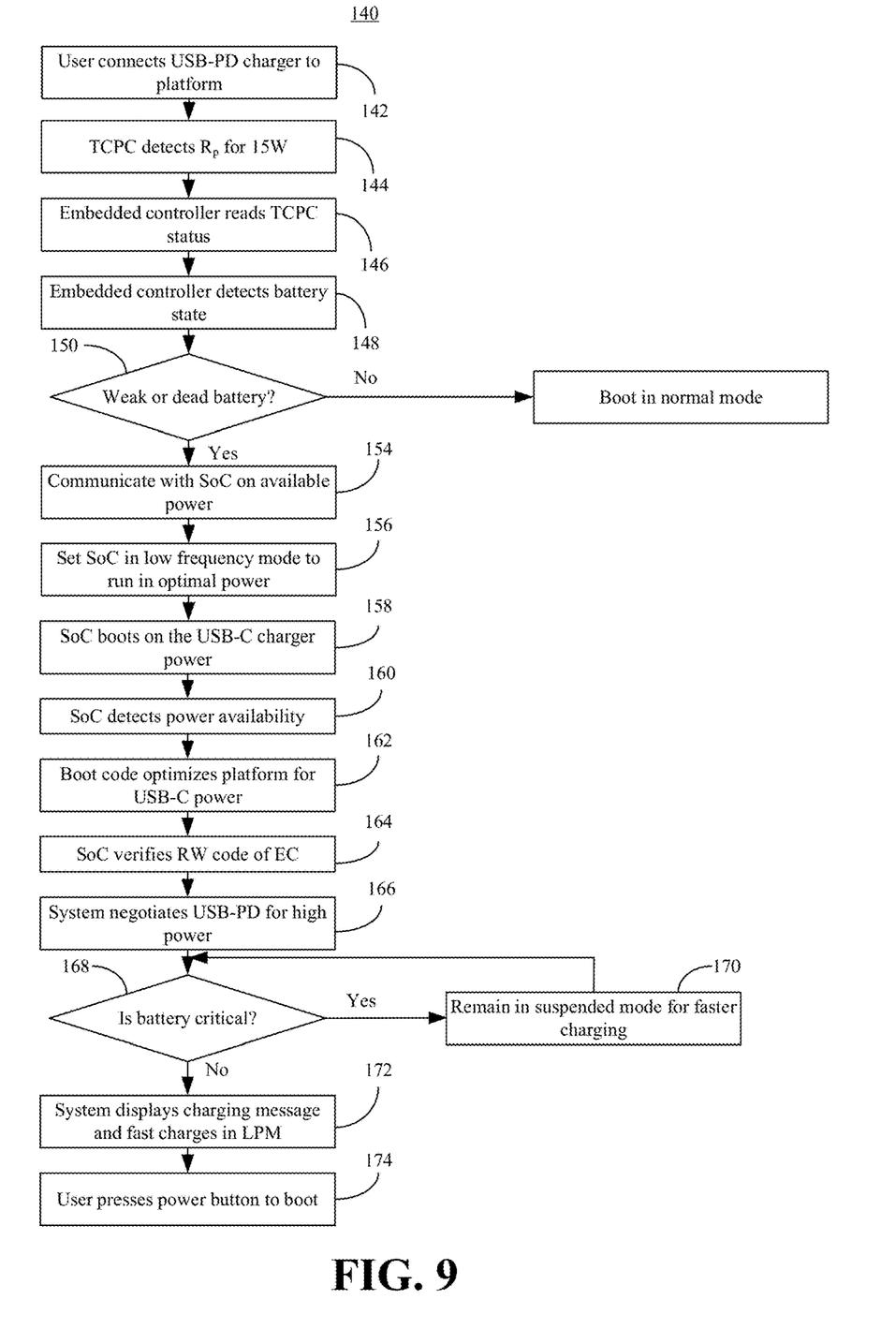
FIG. 9 is a flowchart of an example of a more detailed method of operating a performance-enhanced computing system according to an embodiment.

FIG. 9 shows a more detailed method 140 of operating a performance-enhanced computing system/platform. The method 140 may generally be implemented in a sink device such as, for example, the computing system 20 (FIG. 1), the sink device 44 (FIG. 2), the sink device 50 (FIG. 3) and/or the sink device 80 (FIG. 4), already discussed. More particularly, the method 140 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 142 detects that a user has connected a USB-PD charger to the platform. In an embodiment, a TCPC uses a pull-up resistor to detect that 15 W is available from the charger at block 144. The EC may read the TCPC status at block 146 and check the state of the battery at block 148. If it is determined at block 150 that the battery is neither dead nor weak, block 152 boots the platform in normal mode. If, on the other hand, it is determined at block 150 that the battery is either dead or weak, block 154 communicates with the SoC regarding the available power. Illustrated block 156 sets the SoC in low frequency/power mode to run in optimal power, where the SoC boots on the USB-C charger power at block 158.

Additionally, the SoC may detect power availability at block 160. In one example, the platform is optimized for USB-C power by the boot code at block 162. The RW code of the EC is verified by the SoC at block 166, where a determination is made at block 168 as to whether the battery charge level is below a critical threshold. If so, illustrated block 170 remains in suspended mode for faster charging and the method 140 repeats block 168. If it is determined at block 168 that the battery charge level is not below the critical threshold, block 172 provides for displaying a user message and continuing fast charging in LPM. At block 174, a user activation of the power button is detected.

The illustrated method 140 therefore enhances stability, security, efficiency and performance by ensuring that stalls and/or errors are not encountered prior to verification of the boot. Moreover, charging the internal battery of the computing system at a high rate further enhances performance and improves the user experience.

Figure 10:
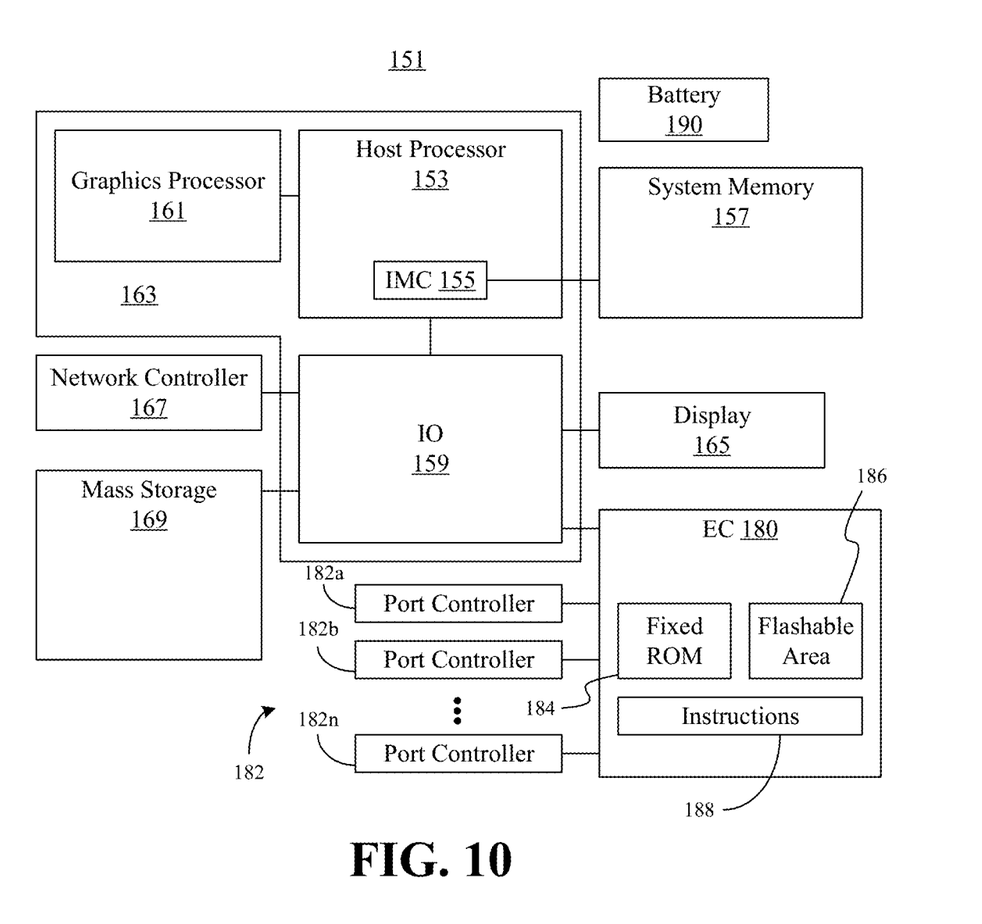
FIG. 10 is a block diagram of an example of a performance-enhanced computing system according to an embodiment.

Turning now to FIG. 10, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In an embodiment, the system 151 sinks power from a source device (not shown). In the illustrated example, the system 151 includes a host processor 153 (e.g., central processing unit/CPU) having an integrated memory controller (IMC) 155 that is coupled to a system memory 157.

The illustrated system 151 also includes an input output (IO) module 159 implemented together with the host processor 153 and a graphics processor 161 (e.g., graphics processing unit/GPU) on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless), mass storage 169 (e.g., hard disk drive/HDD, optical disk, solid state drive/SSD, flash memory), and an EC 180. In one example, the EC 180 includes a fixed ROM 184 and a flashable area 186. In an embodiment, the flashable area 186 includes code to perform one or more boot operations. The illustrated computing system 151 also includes a battery 190 and a plurality of port controllers 182 (182a-182n).

In an embodiment, the EC 180 executes instructions 188 to perform one or more aspects of the method 100 (FIG. 5), the method 110 (FIG. 6), the method 120 (FIG. 7), the method 130 (FIG. 8) and/or the method 140 (FIG. 9), already discussed. Thus, execution of the instructions 188 by the EC 180 may cause the EC 180 to initiate a boot of the computing system 151 while the computing system 151 is in a low power mode, conduct a verification that code to perform the boot is uncorrupted, and negotiate an increased power delivery with a source device connected to the computing system if the verification is successful. In an embodiment, the verification includes confirming that the code in the flashable area 186 has not been tampered with.

Additionally, execution of the instructions 188 may cause the EC 180 to detect a charge level of the battery 190 in response to a connection of one of the port controllers 182 to the source device, place the computing system 151 in the low power mode if the charge level is below a critical threshold, and disconnect the battery 190 from the source device until negotiation of the increased power delivery is complete. The computing system 151 is therefore performance-enhanced at least to the extent that it eliminates stalls and/or errors prior to verification of the boot and charges the battery 190 of the computing system 151 at a high rate. Additionally, excluding the instructions 188 from the fixed ROM 184 may prevent a blotted code size. Although the instructions 188 are shown in the EC 180, the instructions 188 may reside elsewhere in the computing system 151.

Figure 11:
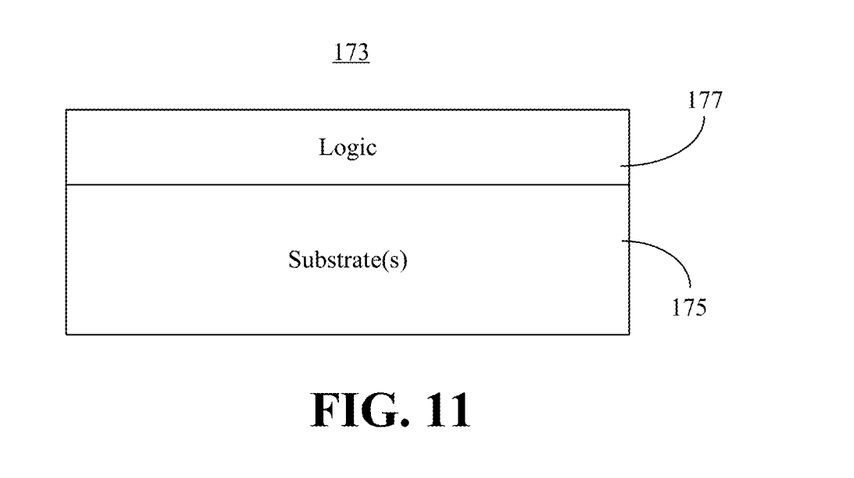
FIG. 11 is an illustration of an example of a semiconductor apparatus according to an embodiment.

FIG. 11 shows an embedded controller 173 (e.g., semiconductor package apparatus). The illustrated embedded controller 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 100 (FIG. 5), the method 110 (FIG. 6), the method 120 (FIG. 7), the method 130 (FIG. 8) and/or the method 140 (FIG. 9), already discussed. Thus, the logic 177 may initiate a boot of a computing system containing the embedded controller 173 while the computing system is in a low power mode, conduct a verification that code to perform the boot is uncorrupted, and negotiate an increased power delivery with a source device connected to the computing system if the verification is successful.

Additionally, the logic 177 may detect a charge level of a battery in the computing system in response to a connection of a controller in the computing system to the source device, place the computing system in the low power mode if the charge level is below a critical threshold, and disconnect the battery from the source device until negotiation of the increased power delivery is complete. The embedded controller 173 is therefore performance-enhanced at least to the extent that it eliminates stalls and/or errors prior to verification of the boot and charges the battery of the computing system at a high rate.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 12:
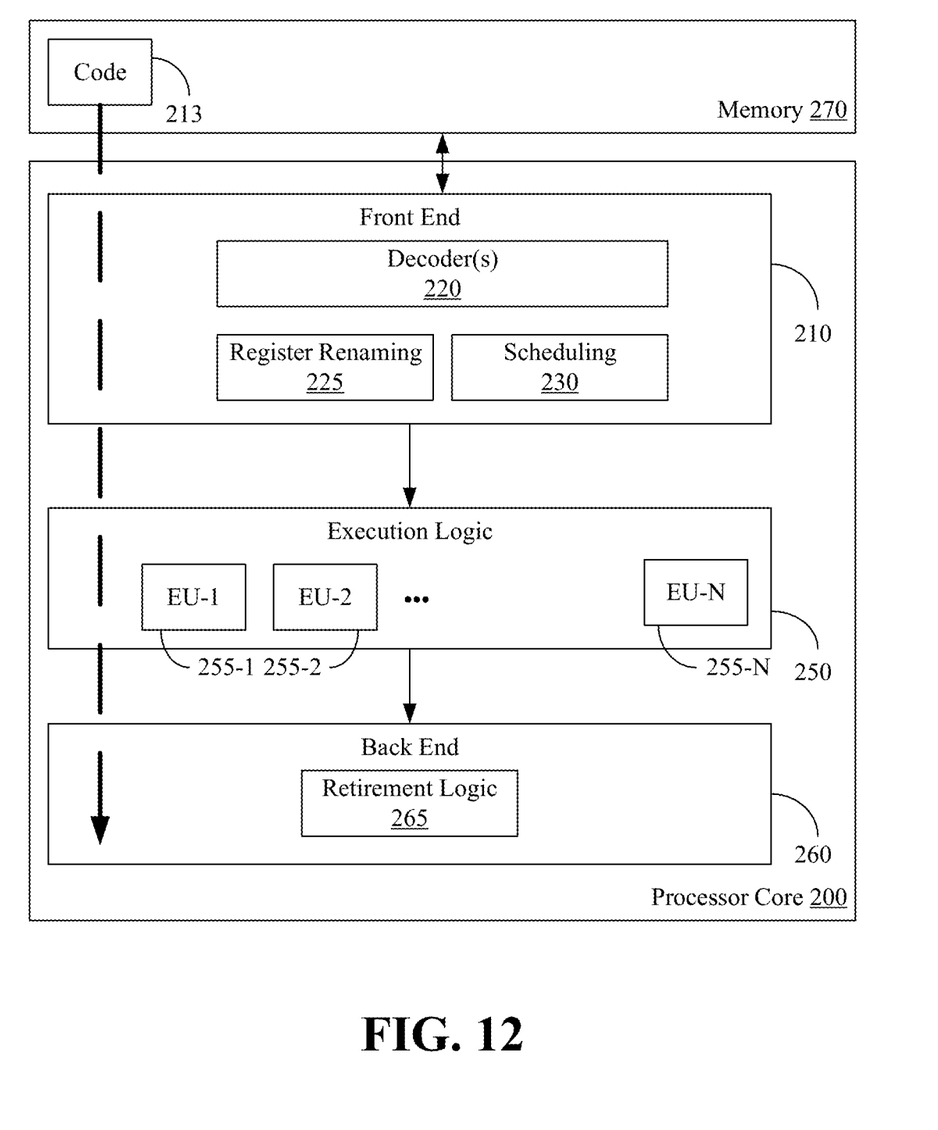
FIG. 12 is a block diagram of an example of a processor according to an embodiment.

FIG. 12 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 12, a processing element may alternatively include more than one of the processor core 200 illustrated in FIG. 12. The processor core 200 may be a single-threaded core or, for at least one embodiment, the processor core 200 may be multithreaded in that it may include more than one hardware thread context (or "logical processor") per core.

FIG. 12 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 100 (FIG. 5), the method 110 (FIG. 6), the method 120 (FIG. 7), the method 130 (FIG. 8) and/or the method 140 (FIG. 9), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 12, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 13:
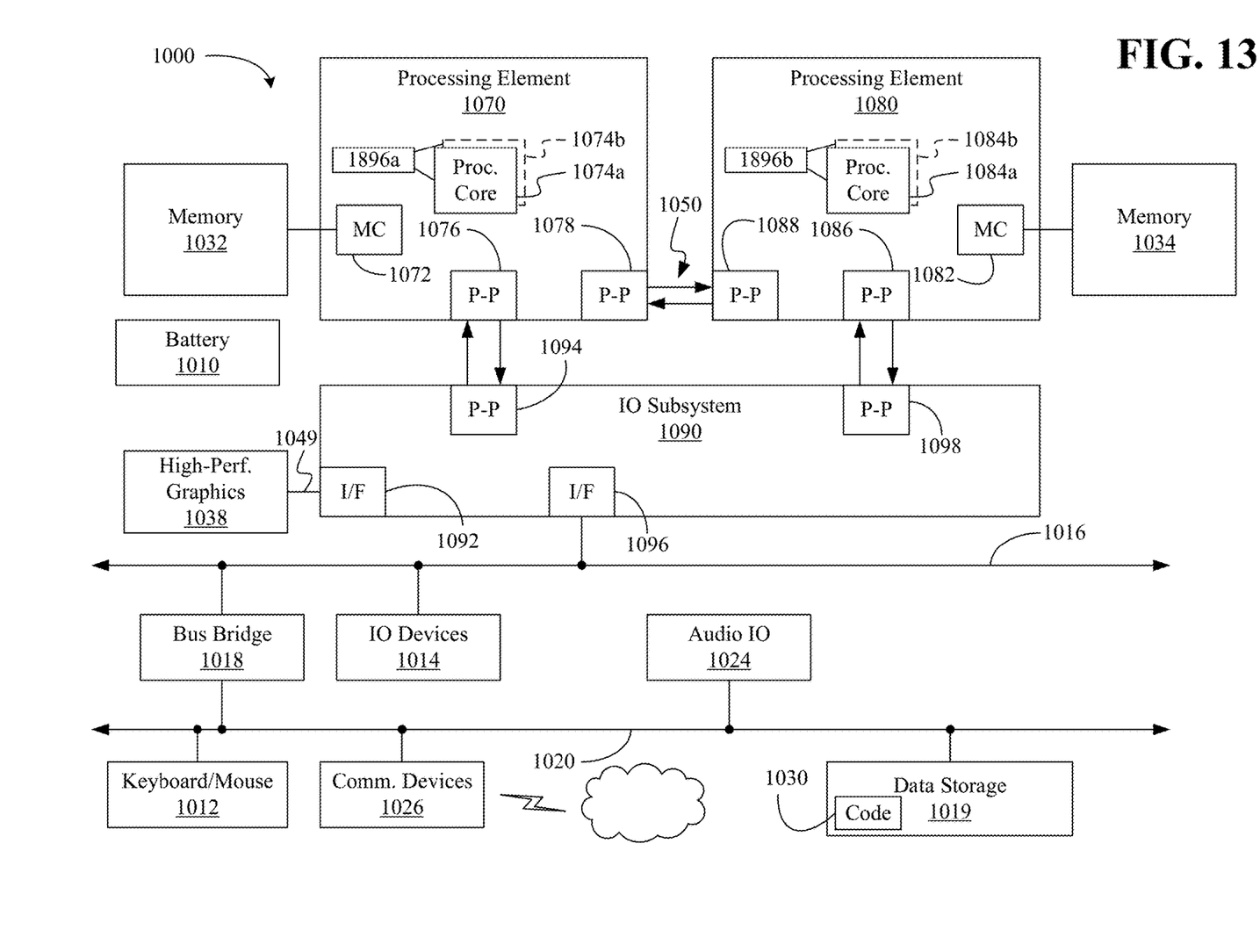
FIG. 13 is a block diagram of an example of a multi-processor based computing system according to an embodiment.

Referring now to FIG. 13, shown is a block diagram of a computing system 1000 embodiment in accordance with an embodiment. Shown in FIG. 13 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 13 may be implemented as a multi-drop bus rather than point-to-point interconnect.

As shown in FIG. 13, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 12.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 13, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 13, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 13, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 100 (FIG. 5), the method 110 (FIG. 6), the method 120 (FIG. 7), the method 130 (FIG. 8) and/or the method 140 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 13, a system may implement a multi-drop bus or another such communication topology. Also, the elements of FIG. 13 may alternatively be partitioned using more or fewer integrated chips than shown in FIG. 13.

ADDITIONAL NOTES AND EXAMPLES

Example 1 includes a performance-enhanced computing system comprising a battery, a system on chip (SoC), and an embedded controller coupled to the battery and the SoC, the embedded controller including a memory storing a set of executable program instructions, which when executed by the embedded controller, cause the embedded controller to initiate a boot of the computing system while the computing system is in a low power mode, conduct a verification that code to perform the boot is uncorrupted, and negotiate an increased power delivery with a source device connected to the computing system if the verification is successful.

Example 2 includes the computing system of Example 1, further including a port controller, wherein, when executed, the instructions cause the embedded controller to detect a charge level of the battery in response to a connection of the port controller to the source device, place the computing system in the lower power mode if the charge level is below a critical threshold, and disconnect the battery from the source device until negotiation of the increased power delivery is complete.

Example 3 includes the computing system of Example 2, wherein, when executed, the instructions cause the embedded controller to connect the battery to the source device when negotiation of the increased power delivery is complete.

Example 4 includes the computing system of Example 3, further including a display, wherein, when executed, the instructions cause the embedded controller to determine that the charge level is above the critical threshold, and generate a user message via the display in response to the charge level being above the critical threshold.

Example 5 includes the computing system of any one of Examples 2 to 4, wherein, when executed, the instructions cause the embedded controller to conduct an authentication of the battery if the verification is successful.

Example 6 includes the computing system of Example 5, wherein, when executed, the instructions cause the embedded controller to prevent a connection of the battery to the source device if the authentication is unsuccessful, and connect the battery to the source device if the authentication is successful.

Example 7 includes an embedded controller comprising one or more substrates, and logic coupled to the one or more substrates, wherein the logic is implemented at least partly in one or more of configurable logic or fixed-functionality hardware logic, the logic coupled to the one or more substrates to initiate a boot of a computing system containing the embedded controller while the computing system is in a low power mode, conduct a verification that code to perform the boot is uncorrupted, and negotiate an increased power delivery with a source device connected to the computing system if the verification is successful.

Example 8 includes the embedded controller of Example 7, wherein the logic coupled to the one or more substrates is further to detect a charge level of a battery in the computing system in response to a connection of a port controller in the computing system to the source device, place the computing system in the lower power mode if the charge level is below a critical threshold, and disconnect the battery from the source device until negotiation of the increased power delivery is complete.

Example 9 includes the embedded controller of Example 8, wherein the logic coupled to the one or more substrates is further to connect the battery to the source device when negotiation of the increased power delivery is complete.

Example 10 includes the embedded controller of Example 9, wherein the logic coupled to the one or more substrates is further to determine that the charge level is above the critical threshold, and generate a user message in response to the charge level being above the critical threshold.

Example 11 includes the embedded controller of any one of Examples 8 to 10, wherein the logic coupled to the one or more substrates is further to conduct an authentication of the battery if the verification is successful.

Example 12 includes the embedded controller of Example 11, wherein the logic coupled to the one or more substrates is further to prevent a connection of the battery to the source device if the authentication is unsuccessful, and connect the battery to the source device if the authentication is successful.

Example 13 includes the embedded controller of any one of Examples 7 to 12, wherein the logic coupled to the one or more substrates includes transistor channel regions that are positioned within the one or more substrates.

Example 14 includes at least one computer readable storage medium comprising a set of executable program instructions, which when executed by an embedded controller, cause the embedded controller to initiate a boot of a computing system containing the embedded controller while the computing system is in a low power mode, conduct a verification that code to perform the boot is uncorrupted, and negotiate an increased power delivery with a source device connected to the computing system if the verification is successful.

Example 15 includes the at least one computer readable storage medium of Example 14, wherein the instructions, when executed, further cause the embedded controller to detect a charge level of a battery in the computing system in response to a connection of a port controller in the computing system to the source device, place the computing system in the lower power mode if the charge level is below a critical threshold, and disconnect the battery from the source device until negotiation of the increased power delivery is complete.

Example 16 includes the at least one computer readable storage medium of Example 15, wherein the instructions, when executed, further cause the embedded controller to connect the battery to the source device when negotiation of the increased power delivery is complete.

Example 17 includes the at least one computer readable storage medium of Example 16, wherein the instructions, when executed, further cause the embedded controller to determine that the charge level is above the critical threshold, and generate a user message in response to the charge level being above the critical threshold.

Example 18 includes the at least one computer readable storage medium of any one of Examples 15 to 17, wherein the instructions, when executed, further cause the embedded controller to conduct an authentication of the battery if the verification is successful.

Example 19 includes the at least one computer readable storage medium of Example 18, wherein the instructions, when executed, further cause the embedded controller to prevent a connection of the battery to the source device if the authentication is unsuccessful, and connect the battery to the source device if the authentication is successful.

Example 20 includes a method of operating a performance-enhanced computing system, the method comprising initiating a boot of the computing system while the computing system is in a low power mode, conducting a verification that code to perform the boot is uncorrupted, and negotiating an increased power delivery with a source device connected to the computing system if the verification is successful.

Example 21 includes the method of Example 20, further including detecting a charge level of a battery in the computing system in response to a connection of a port controller in the computing system to the source device, placing the computing system in the low power mode if the charge level is below a critical threshold, and disconnecting the battery from the source device until negotiation of the increased power delivery is complete.

Example 22 includes the method of Example 21, further including connecting the battery to the source device when negotiation of the increased power delivery is complete.

Example 23 includes the method of Example 22, further including determining that the charge level is above the critical threshold, and generating a user message in response to the charge level being above the critical threshold.

Example 24 includes the method of any one of Examples 21 to 23, further including conducting an authentication of the battery if the verification is successful.

Example 25 includes the method of Example 24, further including preventing a connection of the battery to the source device if the authentication is unsuccessful, and connecting the battery to the source device if the authentication is successful.

Example 26 includes means for performing the method of any one of Examples 20 to 25.

Thus, technology described herein performs pre-boot optimizations to ensure lower power during boots and provide a more stable system. The technology may also perform two stage power scaling of boot power requirements to enable the platform for verified boot in USB-C power and subsequently switch to high power negotiation. Initially, an external embedded controller may detect the system battery health for dead or weak battery states and instruct an SoC power unit to scale the SoC for low frequency in pre-boot initialization. The EC technology may also configure the SoC into an optimal low frequency mode to ensure that during boot the peak power requirement does not exceed USB-C power. After successful configuration, the EC may pass on the USB-C power for the platform to boot the CPU by configuring the direct current-to-direct current (DC-DC) system. At this juncture, the boot code may detect the power availability and lower the power requirement of the platform by dynamically identifying non-critical components. The system may remain in the optimal state until the battery reaches sufficient power. At such time, user perceivable components may be enabled to indicate that the system is charging to provide maximum power.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a battery;
   a system on chip (SoC); and
   an embedded controller coupled to the battery and the SoC, the embedded controller including a memory storing a set of executable program instructions, which when executed by the embedded controller, cause the embedded controller to:
   initiate a boot of the computing system while the computing system is in a low power mode,
   conduct a verification that code to perform the boot is uncorrupted,
   negotiate an increased power delivery with a source device connected to the computing system when the verification is successful,
   prevent a connection of the battery to the source device when an authentication of the battery is unsuccessful, and
   connect the battery to the source device when the authentication is successful.

2. The computing system of claim 1, further including a port controller, wherein, when executed, the instructions cause the embedded controller to:
- detect a charge level of the battery in response to a connection of the port controller to the source device,
- place the computing system in the lower power mode when the charge level is below a critical threshold, and
- disconnect the battery from the source device until negotiation of the increased power delivery is complete.

3. The computing system of claim 2, wherein, when executed, the instructions cause the embedded controller to connect the battery to the source device when negotiation of the increased power delivery is complete.

4. The computing system of claim 3, further including a display, wherein, when executed, the instructions cause the embedded controller to:
- determine that the charge level is above the critical threshold, and
- generate a user message via the display in response to the charge level being above the critical threshold.

5. The computing system of claim 2, wherein, when executed, the instructions cause the embedded controller to conduct the authentication of the battery when the verification is successful.

6. An embedded controller comprising:
- one or more substrates; and
- logic coupled to the one or more substrates, wherein the logic is implemented at least partly in one or more of configurable logic or fixed-functionality hardware logic, the logic coupled to the one or more substrates to:
- initiate a boot of a computing system containing the embedded controller while the computing system is in a low power mode,
- conduct a verification that code to perform the boot is uncorrupted,
- negotiate an increased power delivery with a source device connected to the computing system when the verification is successful,
- prevent a connection of a battery to the source device when an authentication of the battery is unsuccessful, wherein the computing system contains the battery, and
- connect the battery to the source device when the authentication is successful.

7. The embedded controller of claim 6, wherein the logic coupled to the one or more substrates is further to:
- detect a charge level of the battery in response to a connection of a port controller in the computing system to the source device,
- place the computing system in the lower power mode when the charge level is below a critical threshold, and
- disconnect the battery from the source device until negotiation of the increased power delivery is complete.

8. The embedded controller of claim 7, wherein the logic coupled to the one or more substrates is further to connect the battery to the source device when negotiation of the increased power delivery is complete.

9. The embedded controller of claim 8, wherein the logic coupled to the one or more substrates is further to:
- determine that the charge level is above the critical threshold, and
- generate a user message in response to the charge level being above the critical threshold.

10. The embedded controller of claim 7, wherein the logic coupled to the one or more substrates is further to conduct the authentication of the battery when the verification is successful.

11. The embedded controller of claim 6, wherein the logic coupled to the one or more substrates includes transistor channel regions that are positioned within the one or more substrates.

12. At least one non-transitory computer readable storage medium comprising a set of executable program instructions, which when executed by an embedded controller, cause the embedded controller to:
- initiate a boot of a computing system containing the embedded controller while the computing system is in a low power mode;
- conduct a verification that code to perform the boot is uncorrupted;
- negotiate an increased power delivery with a source device connected to the computing system when the verification is successful;
- prevent a connection of a battery to the source device when an authentication of the battery is unsuccessful, wherein the computing system contains the battery; and
- connect the battery to the source device when the authentication is successful.

13. The at least one non-transitory computer readable storage medium of claim 12, wherein the instructions, when executed, further cause the embedded controller to:
- detect a charge level of the battery in response to a connection of a port controller in the computing system to the source device;
- place the computing system in the lower power mode when the charge level is below a critical threshold; and
- disconnect the battery from the source device until negotiation of the increased power delivery is complete.

14. The at least one non-transitory computer readable storage medium of claim 13, wherein the instructions, when executed, further cause the embedded controller to connect the battery to the source device when negotiation of the increased power delivery is complete.

15. The at least one non-transitory computer readable storage medium of claim 14, wherein the instructions, when executed, further cause the embedded controller to:
- determine that the charge level is above the critical threshold; and
- generate a user message in response to the charge level being above the critical threshold.

16. The at least one non-transitory computer readable storage medium of claim 13, wherein the instructions, when executed, further cause the embedded controller to conduct the authentication of the battery when the verification is successful.

17. A method comprising:
- initiating a boot of a computing system while the computing system is in a low power mode;
- conducting a verification that code to perform the boot is uncorrupted;
- negotiating an increased power delivery with a source device connected to the computing system when the verification is successful;
- preventing a connection of a battery to the source device when an authentication of the battery is unsuccessful, wherein the computing system contains the battery; and
- connecting the battery to the source device when the authentication is successful.

18. The method of claim 17, further including:
- detecting a charge level of the battery in the computing system in response to a connection of a port controller in the computing system to the source device;
- placing the computing system in the low power mode when the charge level is below a critical threshold; and disconnecting the battery from the source device until negotiation of the increased power delivery is complete.

19. The method of claim 18, further including connecting the battery to the source device when negotiation of the increased power delivery is complete.

20. The method of claim 19, further including:
  determining that the charge level is above the critical threshold; and
  generating a user message in response to the charge level being above the critical threshold.

21. The method of claim 18, further including conducting an authentication of the battery when the verification is successful.

* * * * *